Figure 1:
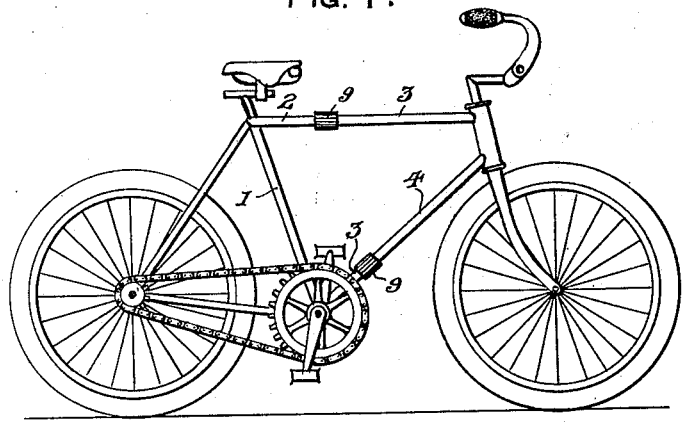

F. A. MALEC.
BICYCLE.
APPLICATION FILED OCT. 3, 1921.

1,427,402.

Patented Aug. 29, 1922.

Inventor
F. A. Malec

By F. K. Bryant
Attorney

UNITED STATES PATENT OFFICE.

FRANK A. MALEC, OF PAWTUCKET, RHODE ISLAND, ASSIGNOR OF ONE-HALF TO WINCENTY KOCHAN, OF CENTRAL FALLS, RHODE ISLAND.

BICYCLE.

1,427,402.  Specification of Letters Patent.  Patented Aug. 29, 1922.

Application filed October 3, 1921. Serial No. 505,023.

*To all whom it may concern:*

Be it known that I, FRANK A. MALEC, a citizen of Poland, residing at Pawtucket, in the county of Providence and State of Rhode Island, have invented certain new and useful Improvements in Bicycles, of which the following is a specification.

This invention relates to certain new and useful improvements in bicycles and has particular reference to a bicycle having a collapsible frame to provide for the compact storing and shipping of the bicycle.

The primary object of the invention resides in the provision of a bicycle wherein the bars of the usual triangular frame construction are detachably connected and of sectional formation to permit collapsing thereof for purposes of storing and shipping to occupy a minimum amount of space.

A further object of the invention has reference to a sectional frame for bicycles wherein the connecting members between the frame sections are reinforced for purposes of strengthening the same when the frame sections are assembled.

With the above general objects in view and others that will become apparent as the nature of the invention is better understood, the present invention consists in the novel form, combination and arrangement of parts hereinafter more fully described in connection with the accompanying drawing and in which like characters of reference indicate corresponding parts throughout the several views.

Figure 2:
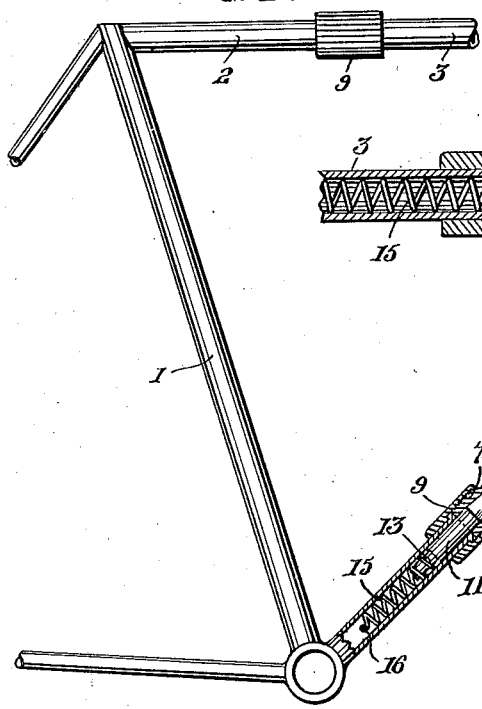
Figure 3:
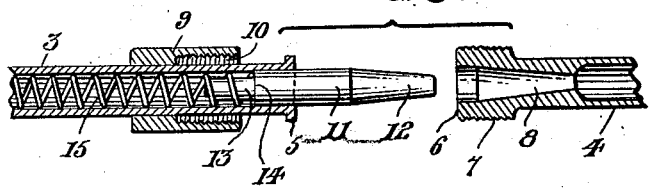

In the drawing,

Figure 1 is a side elevational view of a bicycle constructed in accordance with the present invention, Figure 2 is an enlarged fragmentary side elevational view, partly shown in section of a portion of the bicycle frame, and Figure 3 shows detail sectional views of the connected ends of the frame sections disengaged.

Referring more in detail to the accompanying drawing, there is illustrated a bicycle of the usual type embodying a triangular body frame having a rear bar 1, an upper horizontal bar formed of sections 2 and 3 and a lower upwardly and forwardly inclined bar formed of sections 3 and 4, the frame being supported on wheels and being further provided with the ordinary type of seat and handle bar steering construction.

The invention resides in the connection between the bar sections 2—3 and 3—4, this connection being shown in detail in Figures 2 and 3, the lower bar section being shown in detail with the bar sections 3 having a lateral end flange 5 adapted to abut the enlarged head 6 upon the section 4, the head being cylindrical and externally threaded as at 7, a tapered socket 8 being provided in the end of the bar section 4. When the bar sections 3 and 4 are in abutting relations as shown in Figure 2, a coupling sleeve 9 slidable on the section 3 and having an internally threaded socket end 10 is moved into threaded engagement with the threaded head 6 of the bar section 4, thereby securely locking the bar sections 3 and 4 together.

To provide for a reinforcement between the bar sections and to render substantially rigid said bar sections, a plunger rod 11 having a forward tapering end 12 is slidably mounted in the bar section 3, the same having a reduced rear end 13 defining a shoulder 14 with a coil spring surrounding the reduced end 13 and engaging the shoulder 14 at one of its ends while the other end of the spring is anchored as at 16 in the bar section 3. When the bar sections 3 and 4 are assembled, the plunger rod 11 being moved forwardly by the spring 15 causes the tapered end 12 thereof to be received in the tapered socket 8 of the bar section 4, thereby providing a rigid reinforcing element or connecting rod between the tubular bar sections. In disengaging the bar section, it is only necessary to remove the coupling sleeve 9 from engagement with the threaded head 6, whereupon the bar sections 2—3 and 3—4 may be separated and the bicycle frame members readily assembled for occupying a minimum of space.

While there is herein shown and described the preferred embodiment of the invention, it is to be understood that minor changes may be made in the novel form, combination and arrangement of parts without departing from the spirit and scope of the invention as claimed.

What is claimed as new is:

A bicycle of the type described comprising frame bars formed of connected sections, the connection including a sliding internally threaded sleeve carried by one section adapted for threaded engagement with the end of the other section, the latter section having a tapered socket in the end thereof, a plunger rod having a tapered end resiliently mounted in the first named section and adapted to be moved into the socket in the other section.

In testimony whereof I affix my signature.

FRANK A. MALEC.